United States Patent [19]

Beethe

[11] Patent Number: 5,313,574
[45] Date of Patent: May 17, 1994

[54] METHOD FOR STARTING PROCESSING OF AN ICONIC PROGRAMMING SYSTEM

[75] Inventor: Douglas C. Beethe, Loveland, Colo.

[73] Assignee: Hewlett-Packard Company, Palo Alto, Calif.

[21] Appl. No.: 782,220

[22] Filed: Oct. 24, 1991

Related U.S. Application Data

[63] Continuation-in-part of Ser. No. 537,550, Jun. 13, 1990, abandoned.

[51] Int. Cl.⁵ ............................................. G06F 15/62
[52] U.S. Cl. .................................................... 395/159
[58] Field of Search ............................ 395/155–161, 395/375, 650, 275, 700; 340/709–710, 721, 723; 364/488–491, 474.24; 345/157, 163

[56] References Cited

U.S. PATENT DOCUMENTS

| | | | |
|---|---|---|---|
| 4,901,221 | 2/1990 | Kodosky et al. | 395/159 |
| 4,914,568 | 4/1990 | Kodosky et al. | 395/159 |

OTHER PUBLICATIONS

Edel, "The Tinkertoy Graphical Programming Environment", IEEE Trans. on Soft. Eng., Aug. 1988, pp. 1110–1115.
Labs, "MAC-only DAS software gets DOS counterpart", I&CS, Jan. 1990, p. 118.
Mosley, "LabView Upgrade Reduces Execution Time and Enhances Editing and Graphics Controls", EDN, Sep. 15, 1988, p. 134.
Seiter, "WorkBenchMac 30", MacWorld, May 1990, pp. 381–382.
Strassberg, "Icon-based Instrument-control software works with PC bus data-acquisition boards", EDN, Jan. 4, 1990, p. 81.
*An Instrument That Isn't Really*, Michael Santori, IEEE Spectrum, Aug. 1990, pp. 36–39.
*Labview: Laboratory Virtual Instrument Engineering Workbench*, G. Vose and G. Williams, BYTE Magazine, Sep. 1986, pp. 84–92.
*Programming With Pictures*, Jeff Kodosky and Bob Dye, Computer Language Magazine, Jan. 1989, pp. 61–69.
Labview Product Descripton, National Instruments Corp., Austin, Tex., 1987.

*Primary Examiner*—Gary V. Harkcom
*Assistant Examiner*—John E. Breene

[57] ABSTRACT

A iconic programming system process represented by a directed graph of icons and connections. When a user starts execution of the iconic system, the system first separates the icons into a list of threads starting with icons at the highest level of the graph. Icons at lower levels of the graph, such as icons within subprograms or virtual threads, will be placed on a thread when the subprogram or virtual thread is started. Virtual threads contain all icons connected to the output of an iteration icon. Each thread is processed by selecting a start icon, or by randomly selecting an unconstrained icon if no start icons are present. Processing continues by processing each icon which has all data input available. Each of the threads is processed by processing one icon per thread in each cycle, until all icons have been processed.

11 Claims, 10 Drawing Sheets

METHOD FOR STARTING PROCESSING OF AN ICONIC PROGRAMMING SYSTEM

This application is a continuation in part of application Ser. No. 07/537,550, filed Jun. 13, 1990, now abandoned, which was continued through application Ser. No. 08/063,102, of Douglas C. Beethe, entitled *Processing method for an Iconic Programming System*, and assigned to the same entity.

FIELD OF THE INVENTION

This invention relates to computer systems and more particularly to Iconic Programming Systems. Even more particularly, the invention relates to determining the order of processing each icon in such a system.

BACKGROUND OF THE INVENTION

An iconic programming system is a "programmingless" environment where programming is done by connecting graphical images of tools (icons), together with connecting lines, to form a directed graph and create an iconic network which represents a software program. The iconic programming system may be used in research and development test environments, where several different electronic instruments are connected to test a system or device. Programming such a system requires instructions to cause the various instruments to perform desired functions in order to operate as a system.

When an iconic programming system is used, each instrument will be represented by a graphical icon, also called a graphical object, and the connections between the instruments are represented by lines between the graphical images. In addition to graphical icons representing instruments in such a system, graphical icons are provided for programming functions, for example looping, IF-THEN statements, etc. By combining instrument and programming icons, a user can create an iconic network involving the programmed operation of several instruments.

Iconic systems are designed to process without a particular order as to which icons process before other icons, except that an icon will not process until all data necessary for its processing is available. When all data is available to several icons, they may process simultaneously. In order to construct iconic systems that function with real world instruments, and which function on a single processor, the icons must process is some defined order. One definition of the order for processing icons is supplied by the conventional rules associated with data flow diagrams.

U.S. Pat. No. 4,901,221 issued Feb. 13, 1990 to Kodosky, et al., and assigned to National Instruments, Inc., is an example of an iconic system which follows the conventional rules associated with data flow diagrams.

An important limitation of such a system, however, is that the conventional rules of data flow diagrams require that iteration operations occur at a sublevel below the iteration icon, and thus any data required within the iteration must be passed to the sublevel by means of formal parameters. For instance, a given program network may have three levels, such as a level 3 FOR-loop is nested inside a level 2 FOR-loop which is nested inside a level 1 FOR-loop, such that the icon for level 1 includes the icon for level 2 which includes the icon for level 3. Iteration at, and passage of data to, a given level is restricted, according to the rules of conventional data flow diagrams, to the level and those below it. Thus, iterating at the level 2 FOR-loop would restrict the user to accessing and viewing only the level 2 and level 3 FOR-loops. Iteration and a complete view of the highest level FOR-loop (level 1) would be restricted. Thus the user is restricted, in iterating and passing data, to the level whose icon is most visually manifest. This is a major limitation of prior art iconic programming systems which adhere to the conventional rules of data flow diagrams.

There is a need in the art for a method for defining the order of processing of icons in an iconic programming system that allows processing of iterations while allowing the icons of all iterations to appear at the same level of an iconic network.

SUMMARY OF THE INVENTION

The present invention overcomes this major limitation of the prior art iconic programming systems which use classical dataflow rules by providing a processing method that allows a user to collapse iterations in an iconic programming network to a single "level" so that all the icons within iterations can be visible simultaneously.

In addition, it is an aspect of the present invention to provide a method for processing icons in an iconic programming system.

Another aspect of the invention is to report an error and discontinue processing if all data input pins of an icon are not connected, or if a data input pin has more than one connection.

Another aspect is to process an icon only after such icon has received data on all data input pins and received control input on any sequence input pins, that is, all data and connected sequence inputs have been pinged.

Still another aspect of the invention is to process a selected icon, send data to all downstream icons connected to the selected icon's data outputs, process all downstream icons that have sufficient input data to allow processing, and then send a sequence signal to the selected icon's sequence output.

A further aspect of the invention is to consider a second icon connected to a first icon to be on the same thread as the first icon, to process such icons in a breath-first manner, and to insure no order of processing for icons connected in parallel.

A further aspect is to process an icon having no data input connections at a random time after processing any start icons but before the processing of any other icons having one or more input data connections.

A further aspect is to require a start icon in a thread only when such thread has a feedback loop, and to allow multiple start icons in a thread, wherein all such start icons will be processed before any other icons on the thread.

A further aspect is to process parallel threads in round-robin style with each thread processing one primitive icon per cycle.

A still further aspect of the invention is to treat all icons downstream of an iteration icon as a virtual thread and to repeat processing of such virtual thread with each iteration.

The above and other aspects of the invention are accomplished in an iconic programming system process represented by a directed graph of icons and connections. Each icon within the process may have zero or more data input pins, zero or more data output pins, an optional sequence input pin, an optional sequence output pin, an optional execute input pin, an optional control input pin, and an optional error output pin. Each of these pins may be used to connect the icon to another icon within the directed graph.

When a user starts execution of the iconic system, the system first separates the icons into a list of threads. This list is formed by selecting one of the icons at the top level of the directed graph, and placing that icon, along with all icons connected to it, into the first thread. If any icons remain in the top level, a next unconnected icon is selected and all icons connected to it are placed in a second thread. This process continues until all icons within the top level of the directed graph have been placed in a thread. Icons at lower levels of the graph, such as icons within subprograms or virtual threads, will be placed on a thread when the subprogram or virtual thread is started.

A pending queue and a done stack are then created for each of the threads. Each of the threads is then examined to locate any start icons within the thread. If one or more start icons are found within a thread, the start icons are scheduled by placing them onto the pending queue to start execution. If the thread contains no start icons, it is examined to determine whether it contains any feedback loops. If feedback loops are present and the thread contains no start icons, an error message is displayed and execution stops. If no feedback loops are present, and no start icons are present, then those icons which have no input data connections are placed on the pending queue in a random order. Once the pending queues have been established, execution starts by selecting the first icon in the pending queue of the first thread within the system.

If the selected icon has a sequence input, processing of the icon will only occur if a signal has been received on the sequence input. Receiving data or control information on a input pin is called pinging the input. If the selected icon does not have a sequence input, it will be processed only after each data input has been pinged or has data which is still active and valid. If data is not available on one or more of its data or sequence inputs, processing of the icon will not proceed and the icon will be removed from the pending queue.

If a selected icon is an iteration icon, all icons connected to the data output connections of the icon are copied into a virtual thread. The virtual thread is placed on the list of threads for execution, and the iteration icon, but not its thread, is blocked from executing. After all the icons on the virtual thread have been executed, the thread will be discarded, and the iteration icon unblocked. The iteration icon will then repeat with a new iteration value and again copy all the icons connected to its data output connections to a virtual thread, which is then executed. This process continues until the iteration icon has completed all iterations.

After the icon has been processed, it is placed on the done stack for the thread and the system processes one icon from the next thread in the list of threads. After all threads have processed one icon, the system will return to the first thread to continue in a round-robin manner.

If the pending queue for a thread is empty, the system examines the done stack of the thread. The system will pop the top icon from the done stack and ping any icons connected to the sequence output of the icon. Each of these connected icons will then be placed on the pending queue for execution.

When the pending queue and the done stack are both empty, processing for the thread is complete. After processing all threads, execution of the iconic system is complete.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
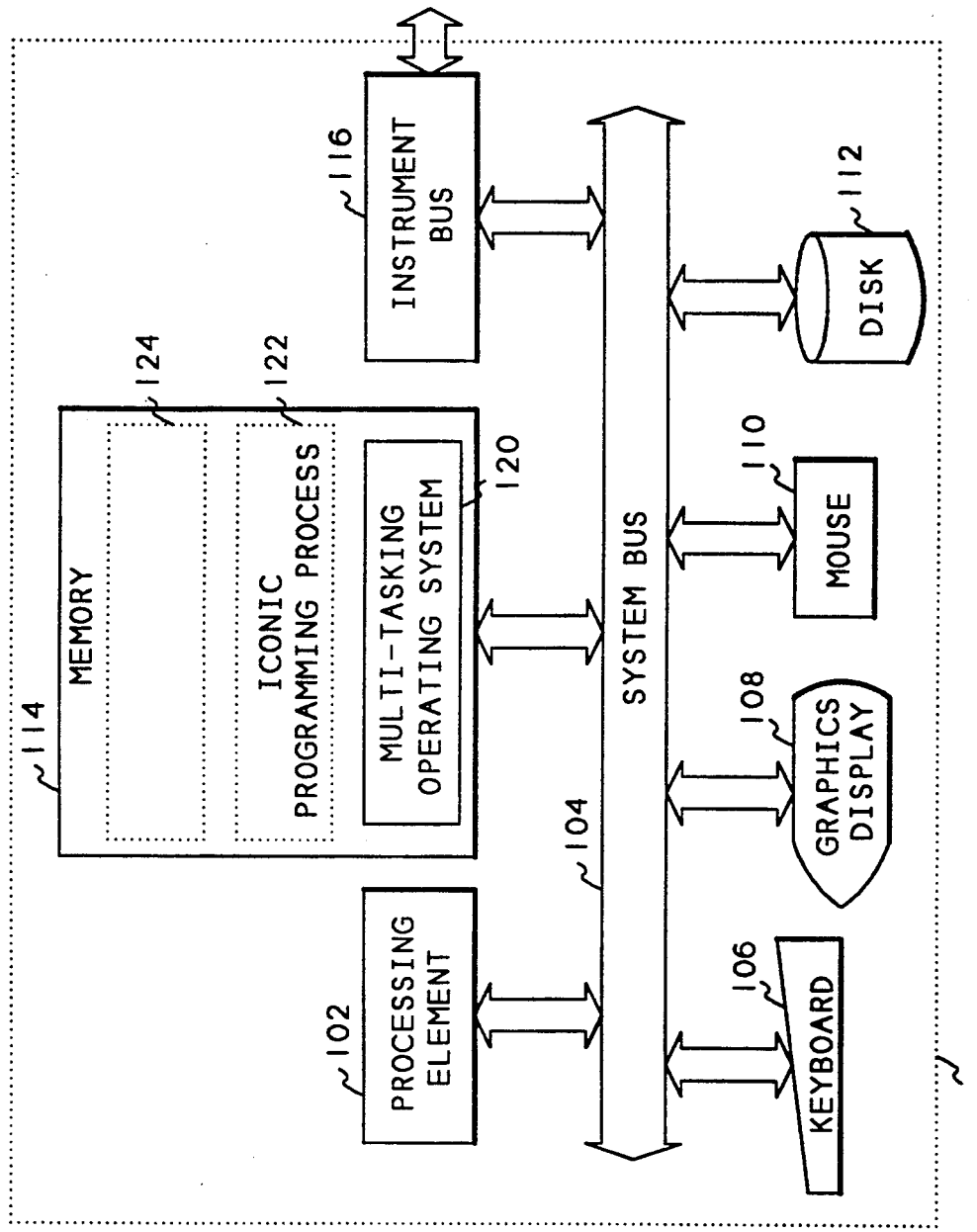
FIG. 1 shows a block diagram of a computer system incorporating the present invention.

FIG. 1 shows a block diagram of a computer system incorporating the present invention. Referring now to FIG. 1, a computer system 100 contains a processing element 102 which connects to the other components of the system through a system bus 104. A keyboard 106 allows a user to input textual data to the system, and a mouse 110 allows a user to input graphical data to the system. A graphics display 108 allows the system to output text and graphical information to the user. A disk 112 is used by the system to store the software of the iconic programming system environment, as well as the user-defined iconic network. A communications interface 116 is used to create a communications network which allows the computer and iconic programming environment to communicate with other computers and other environments. Memory 114 is used to contain the software and user data of the iconic programming environment. A multi-tasking operating system 120 can have a plurality of tasks, also called processes, here illustrated by task 122 and task 124. Task 122 is shown containing the iconic programming process of the present invention.

Figure 2:
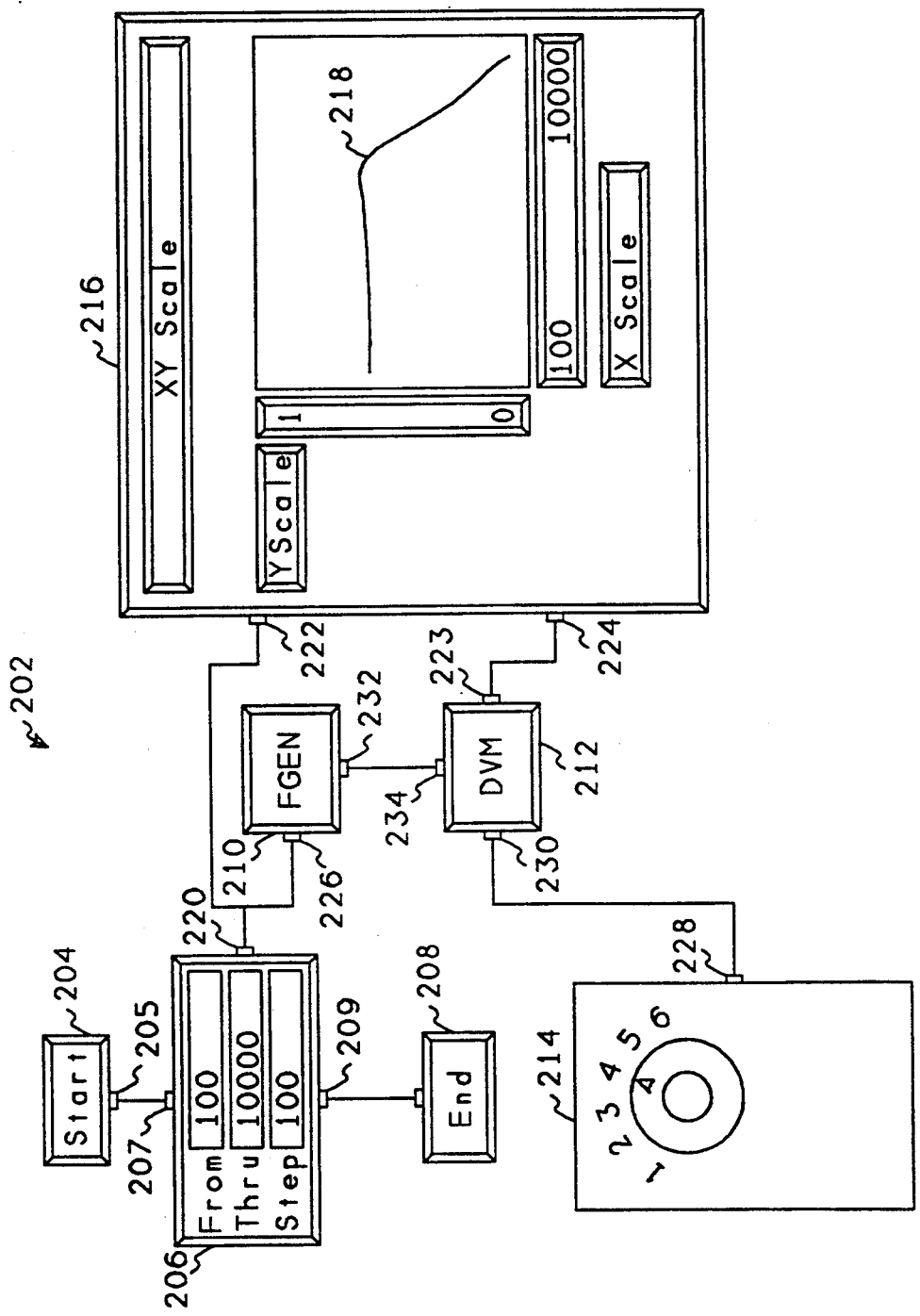
FIG. 2 shows an iconic network for testing an audio filter.

FIG. 2 shows an iconic network for testing an audio filter. Referring now to FIG. 2, iconic network 202, which is a directed graph, is comprised of a start icon 204 having its sequence output 205 connected to the sequence input 207 of an iteration icon 206. The sequence output 209 of the iteration icon 206 connects to an end icon 208. The data output 220 of the iteration icon 206 connects to the data input 226 of a frequency generator 210. The data output 220 also connects to the X input 222 of an X-Y display 216. A sequence output 232 of the frequency generator icon 210 connects to a sequence input 234 of a digital voltmeter 212. The digital voltmeter icon 212 has a data input 230 coming from the data output 228 of a range selector switch 214. The data output 223 of the digital voltmeter is connected to the Y input 224 of the X-Y display 216.

The FGEN icon 210 represents a real external sweep frequency generator which is connected to the input of the audio filter being tested (not shown). The digital voltmeter icon 210 represents an external real digital voltmeter connected to the output of the audio filter being tested. When the start icon 204 is activated, it will send a sequence signal to the iteration icon 206 which will start through an iteration loop. During the first iteration, the iteration icon 206 will send a data value of one hundred over the data output 220 to the frequency generator 210. This will cause the real frequency generator that is connected to the audio filter to output a frequency of one hundred hertz. After the frequency generator has output the one hundred hertz signal, it will inform the FGEN icon 210 that the signal has been output and the FGEN icon 210 will send a sequence signal over the sequence output 232 to the sequence input of the digital voltmeter icon 212. The digital voltmeter icon 212 will obtain a range setting from the range switch 214 and send a signal to the external digital voltmeter to cause it to read the output of the audio filter being tested. The output read by the external digital voltmeter will be sent over the data output 223 to the Y input 224 of the X-Y display. The X-Y display, since it has received an X input of one hundred hertz on data input 222 and a Y input on 224 consisting of the digital voltmeter reading, will plot one point on the X-Y display. After this first iteration is complete, the iteration icon 206 will step the frequency by one hundred hertz and output a frequency of two hundred hertz on data output 220. The steps described above will operate in the same sequence, and a second plot point will be plotted on the X-Y display 216. This will continue until the iteration icon 206 has reached a frequency of ten thousand hertz. At that point, the number of points being plotted will result in the graph 218 on the X-Y display. The iteration icon 206 will then send a sequence signal to end icon 208 and processing will terminate.

Table 1 shows the icon device rules that all icons on graphical network must obey. Table 2 shows the rules involved in processing the icons on a particular thread within a graphical network. Table 3 shows the rules involved in a context. These rules will be better illustrated in the following flowcharts which describe the process of analyzing and executing the icons on a graphical network.

Figure 3:
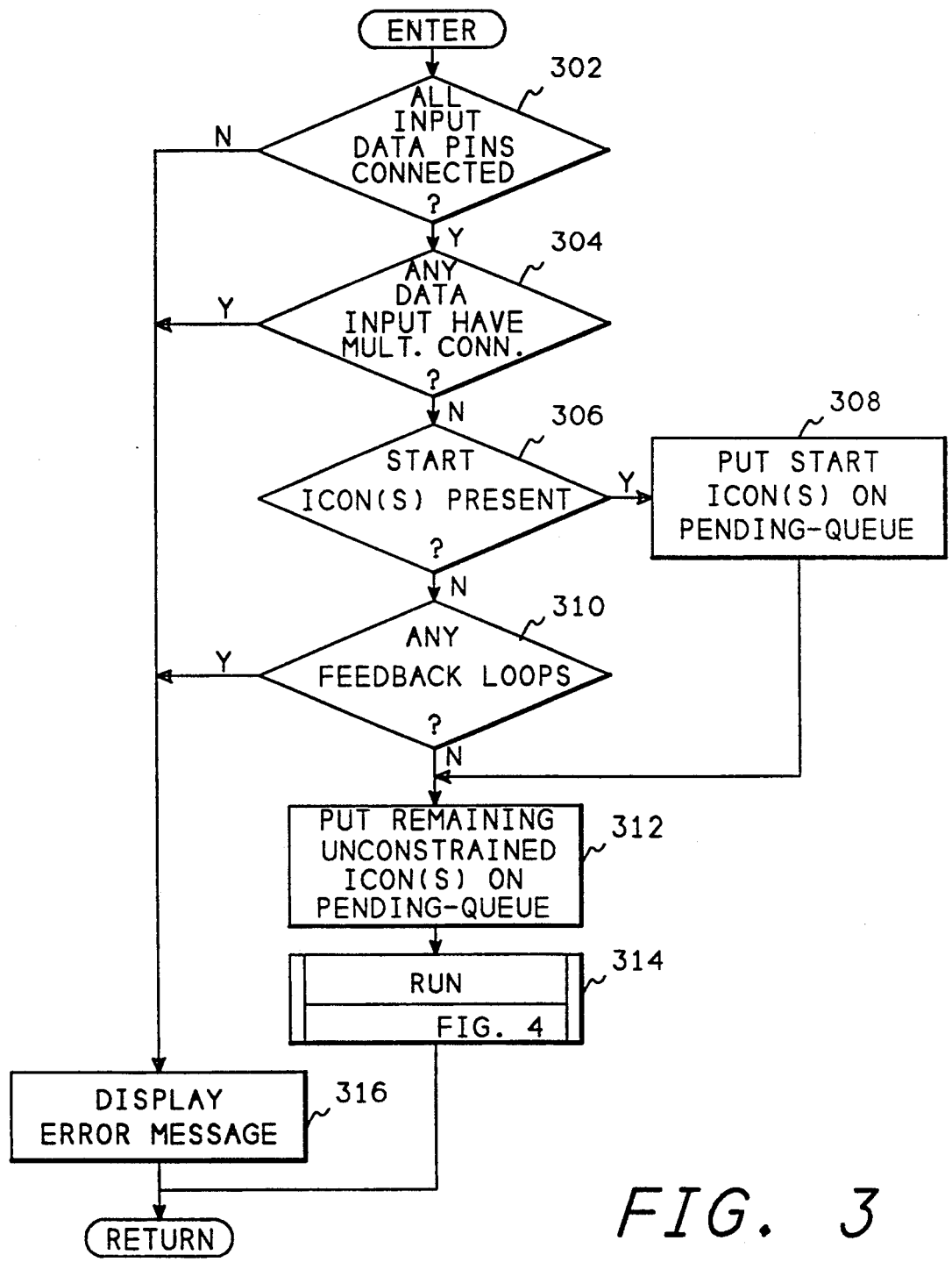
FIG. 3 shows a flowchart of the pre-run process.

FIG. 3 shows a flowchart of the pre-run process of the present invention. This flowchart will be called whenever a user enters a run command, or uses the graphical input device 110 (FIG. 1) to "push" a start icon on a graphical network. Referring now to FIG. 3, after entry, block 302 determines whether all data input pins of all icons have been connected, in order to satisfy Icon Device Rule 1 (Table 1). If any input is unconnected, block 302 transfers to block 316 which displays an error message and returns. If all data input pins are connected, block 302 transfers to block 304 which determines whether any inputs have multiple connections, in order to determine whether rule 1 of the Icon Device Rules (Table 1) has been satisfied. If any data input has multiple connections, block 304 transfers to block 316 which displays an error message before returning. If no input pin has more than one connection, block 304 transfers to block 306 which determines whether any start icons are present in the graphical network. If any start icons are present, block 306 transfers to block 308 which schedules the start icons by placing them in the pending queue of their respective threads in order to satisfy Thread Rule 4 (Table 2) that states that all starts must fire (process) before any other devices on the thread. Block 308 then transfers to block 312 to place the remaining unconstrained icons on the pending queue.

Figure 4:
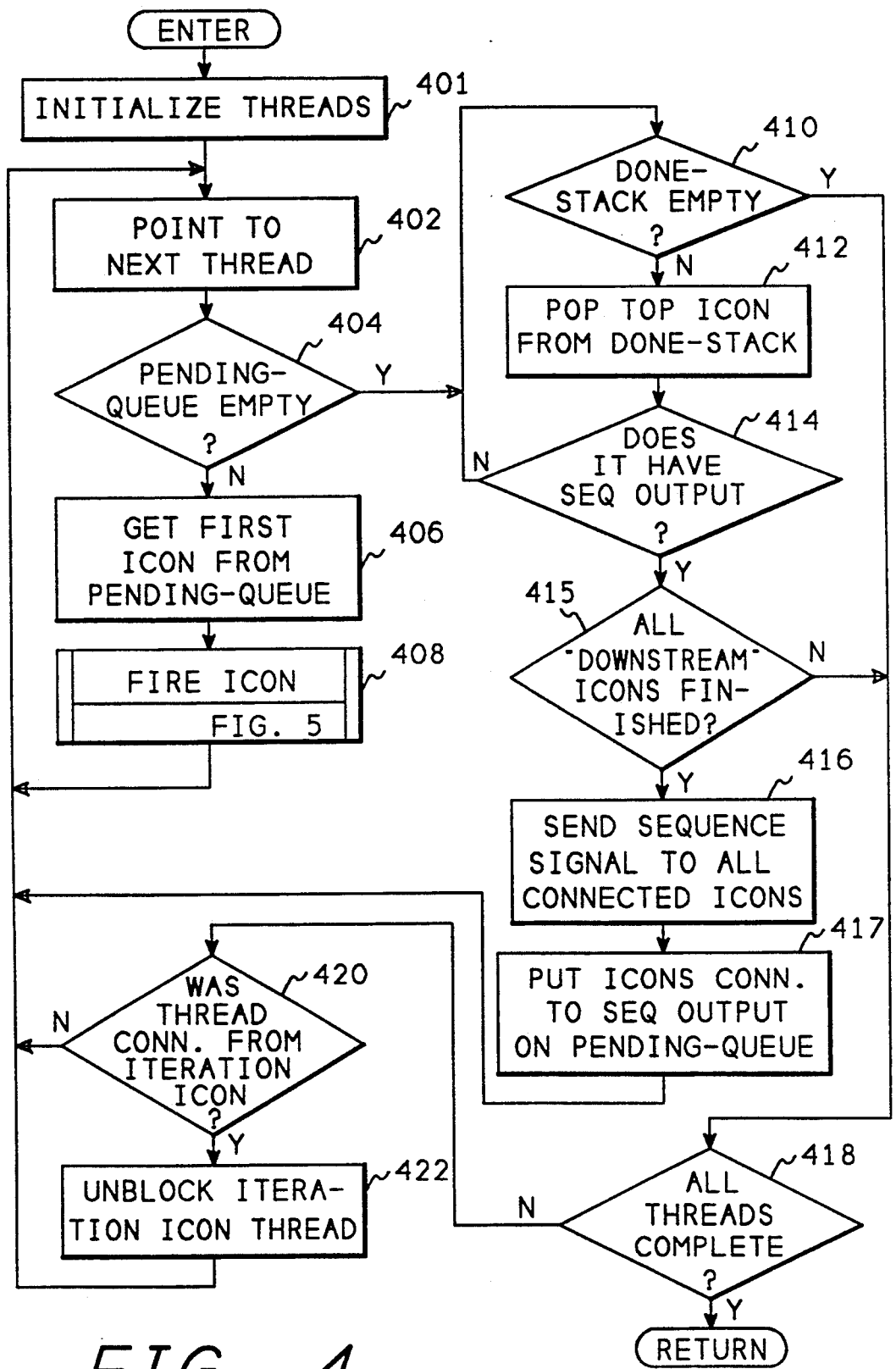
FIG. 4 shows a flowchart of the run process.

If no start icons are present, block 306 transfers to block 310 which checks to determine if any feedback inputs exist for any icons. Since block 306 already determined that no start icons were present, if any feedback inputs exist, block 310 will transfer to block 316 to display an error message, in order to satisfy Thread Rule 5 (Table 2). If no feedback inputs are present, block 310 transfers to block 312. Since no start icon was found on the graph, and no feedback loops were found on the graph, block 312 will place all the remaining unconstrained icons on the graph onto the start queue at the same time, in order to satisfy Thread Rule 7 (Table 2). Block 312 then transfers to block 314 which calls FIG. 4 to process the icons within the graph. FIG. 4 will return after the graphical network has been completely processed, and block 314 will then return to the caller.

FIG. 4 shows a flowchart of the run process. This process is called by FIG. 3 after FIG. 3 has determined that the graph is capable of being processed. Referring now to FIG. 4, after entry, block 401 will initialize the threads and reset all the processed flags, indicating that the icons have not yet fired. Block 402 will then point to the first thread within the graphical network. Each thread on the graphical network has its own pending queue and its own done stack, and these two data structures determine which icon will be processed next within a graph. In order to satisfy Thread Rule 8, if more than one thread exists on a graphical network, the threads will be processed in a round-robin style, with one icon being processed on each thread with each cycle. After pointing to the first, or next thread, block 402 transfers to block 404 which determines whether the pending queue for that thread is empty. If the pending queue is not empty, block 404 transfers to block 406 which gets the first icon from the pending queue for the thread. Block 408 then calls FIGS. 5A and 5B, block 502, to process (fire) the icon just retrieved from the pending queue. After that icon has been processed, FIG. 5A returns to block 402 which points to the next thread.

If the pending queue for a particular thread is empty, block 404 will transfer to block 410 which determines whether the done stack for that thread is empty. If the done stack is not empty, block 410 transfers to block 412 which pops the top icon from the done stack and then block 414 determines whether the icon has a sequence output. If the icon has no sequence output, block 414 returns to block 410 which checks the stack again. If the icon does have a sequence output, block 414 transfers to block 415 which checks to be sure all successor icons which are connected to any of its non-sequence outputs (or any of their successors) have completed execution. If one or more successors is still executing, control is transferred to block 418, otherwise control is transferred to block 416 which sends a sequence signal to all icons connected to the sequence output and then block 417 takes each of the icons connected to the sequence output and places them on the pending queue for the thread. This block satisfies Device Rule 6 (Table 1) by firing the sequence output of all icons after propagation has continued along the standard output lines as far as possible. If block 410 determines that the done stack for a particular thread is empty, it transfers to block 418 which checks to see if all threads have been completely processed. If any thread remains to be processed, block 418 transfers to block 420 which determines whether the thread was connected to an iteration icon. If so, block 422 goes to block 422 to unblock the iteration icon and then returns to block 402 to continue processing that thread. After all threads are complete, block 418 returns to FIG. 3.

Figure 5A:
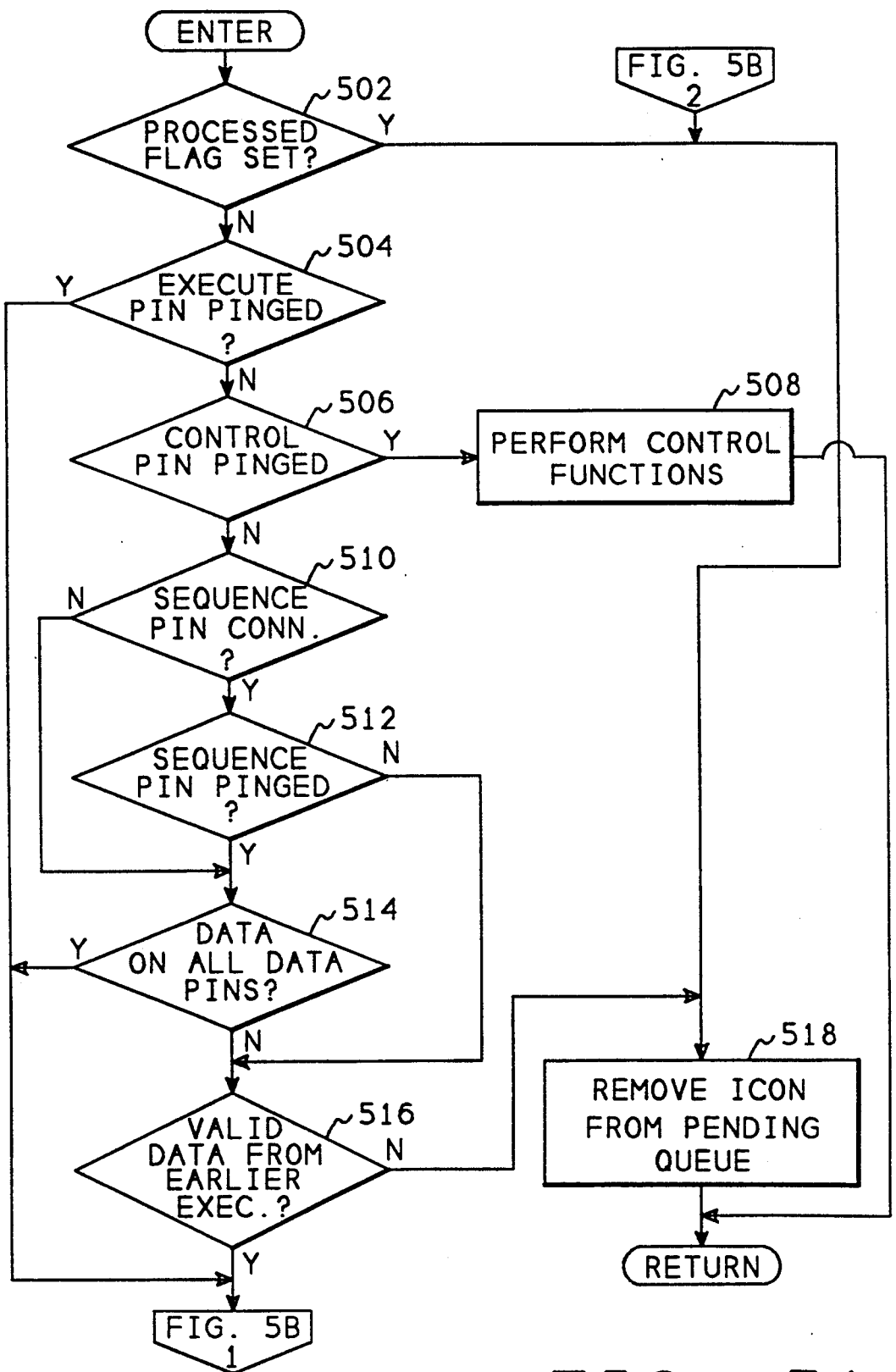
FIGS. 5A and 5B show a flowchart of the method of processing (firing) an icon.
Figure 5B:
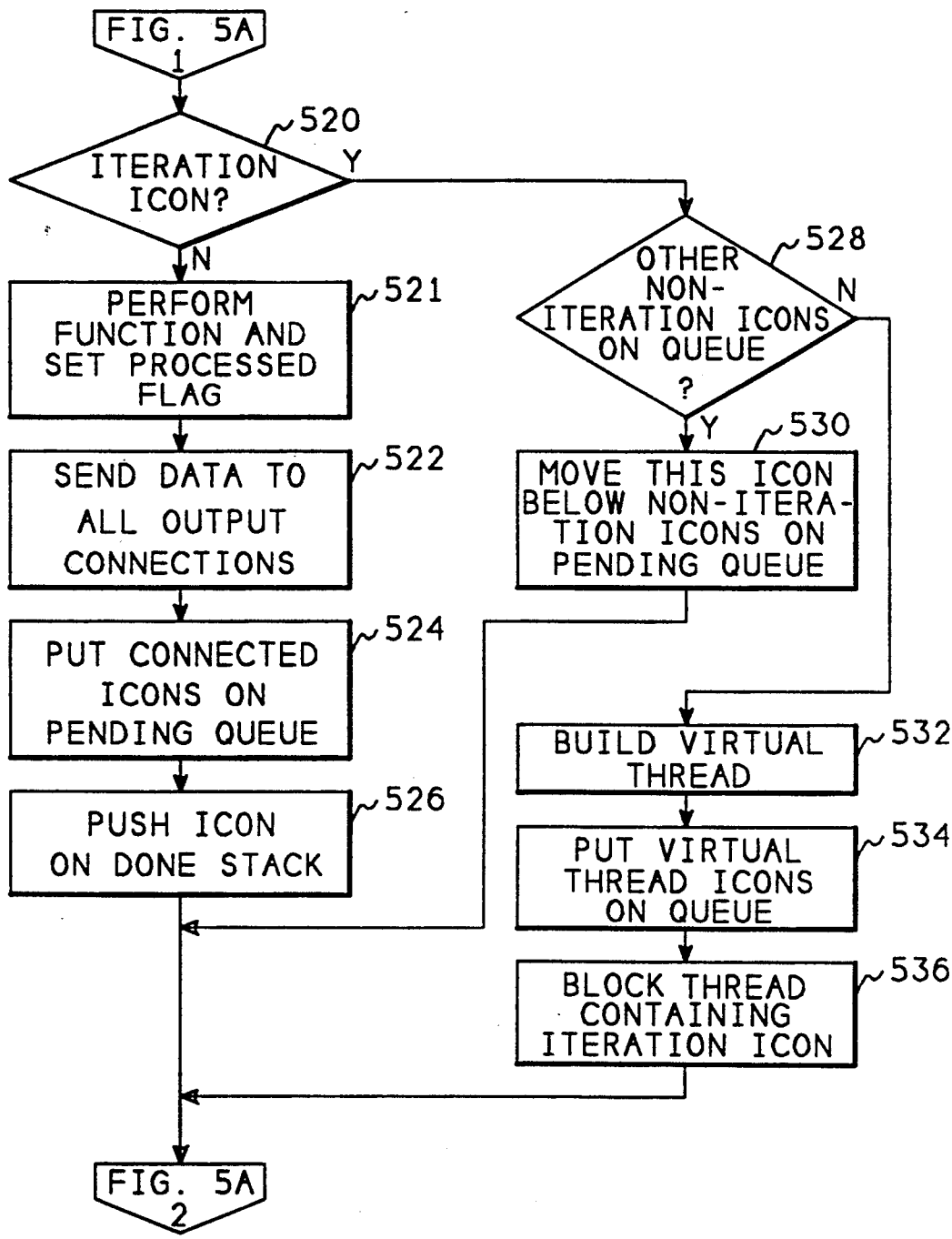

FIGS. 5A and 5B show a flowchart of the method of processing (firing) an icon. Referring now to FIGS. 5A and 5B, after entry, block 502 checks the processed flag and if it is set, control goes to block 518, since an icon will only process once. If the processed flag is not set, block 502 transfers to block 504 which determines whether the execute pin has been pinged. If the execute pin has been pinged, the device will process regardless of other input, so block 504 transfers to block 520 on FIG. 5B.

If the execute pin was not pinged, block 504 goes to block 506 which determines whether the control input for the icon was pinged. If the control input was pinged, the control functions will be performed regardless of other input, so block 506 transfers to block 508 to perform the control function and then control returns to FIG. 4.

If the control input has not been pinged, block 506 goes to block 510 which determines whether the sequence input pin to the icon is connected. If the sequence input is connected, Device Rule 4 (Table 1) states that the device can process (execute) only if a signal has been received on the sequence input. Therefore, if a sequence input is connected, block 510 transfers to block 512 to determine whether a signal has been received on the sequence input. If a signal has not been received on the sequence input, this icon cannot be processed unless input is available on the sequence input from an earlier processing of this thread, so block 512 transfers to block 516.

If a sequence signal has been received, or if the sequence input is not connected, control goes to block 514 which determines whether data has been received on all data input pins, in order to determine whether Device Rule 4 has been satisfied. If data has not been received on one or more data input pins, block 514 transfers to block 516 which determines if data is available for the input pin from an earlier execution of the icon supplying data. That is, if data is available from an earlier execution, the data will be reused by this icon, so block 516 transfers to block 520 on FIG. 5B. If data has been received on all input pins, block 514 transfers to block 520.

Block 520 determines if the icon is an iteration icon. If the icon is an iteration icon, block 520 goes to block 528 which determines whether any non-iteration icons are on the pending queue. Since execution of an iteration icon will block the thread, all non-iteration icons are executed before the iteration icons on a thread. If there are any non-iteration icons on the pending queue, block 530 moves this iteration icon below the non-iteration icons on the queue and then returns to FIG. 4.

If there are no non-iteration icons on the queue, block 528 transfers to block 532. This block creates a virtual thread for all icons connected to the data output of the iteration icon. Block 534 then puts the icons from the virtual thread on the pending queue for the virtual thread. Block 536 then blocks the thread containing the iteration icon before returning to FIG. 4. The virtual thread will then be processed to completion, and the iteration thread will be unblocked by FIG. 4.

If the icon is one that performs a subprogram, the calling icon will be blocked from processing and the subthread(s) will be initialized by resetting the processed flags of all the icons in the subthread(s). The subthread(s) will then be processed to completion, and the calling icon will be unblocked.

If the icon is not an iteration icon, block 520 transfers to block 521 to perform the icon function and set the processed flag for the icon, so that it will not process a second time. Block 522 then sends output data generated by processing the function of the icon to all icons connected to the data output pins. Block 524 then schedules all the icons connected to the data outputs of this icon by placing the icons on the pending queue for the thread, if they are not already on the queue, and if they are not on the done stack. If an icon has multiple output pins, the icons connected to the top pin will be placed on the queue first, then the next pin down, etc. The order for placing icons connected to the same pin is undefined, and they may be placed on the queue in any order. Block 526 then places this icon on the done stack, and transfers back to block 518. Block 518 removes this icon from the pending queue, before returning to FIG. 4.

Figure 6:
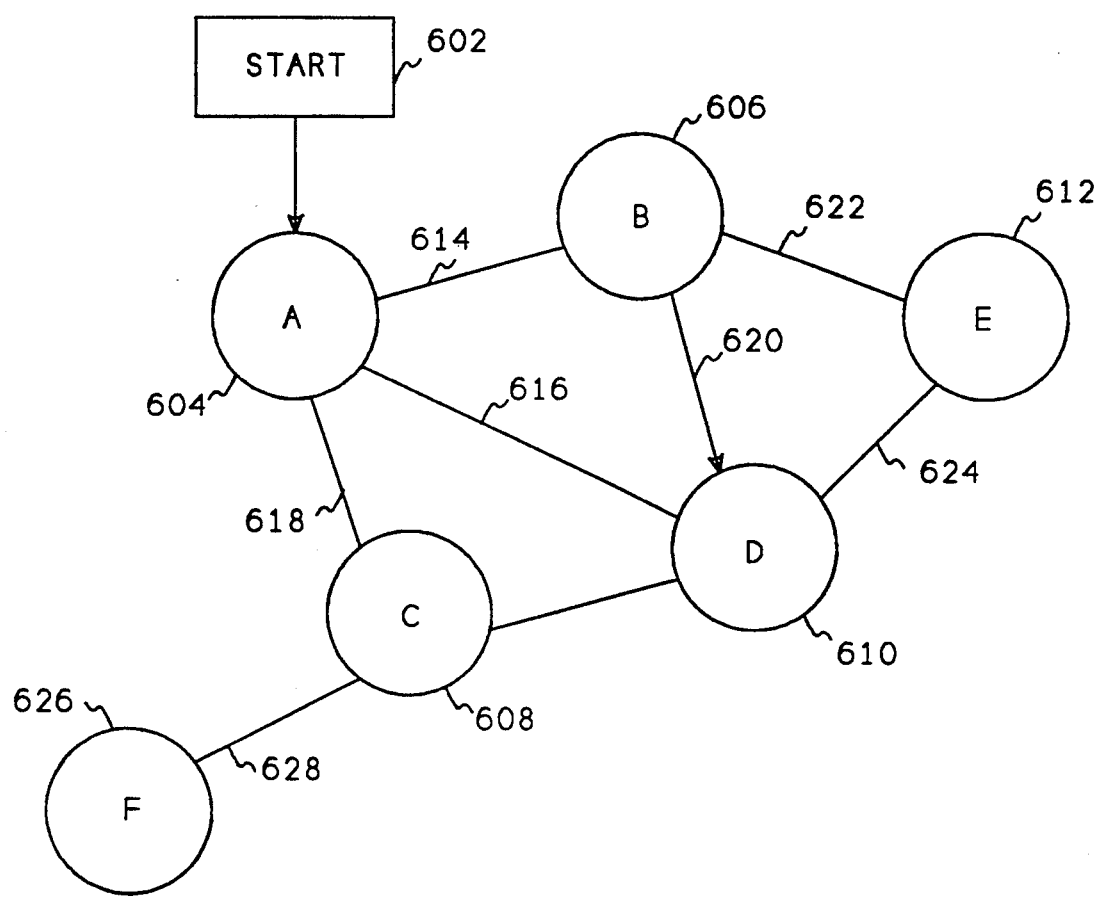
FIG. 6 shows an example of an iconic network.

FIG. 6 shows an example of an iconic network. FIG. 6 will be used to illustrate the flow through the flowcharts of FIGS. 3, 4, 5A and 5B, and to further illustrate the Icon Device Rules of Table 1, the Thread Rules of Table 2, and the Context Rules of Table 3. Referring now to FIG. 6 as well as FIGS. 3, 4, 5A, and 5B, when a user uses the mouse 110 (FIG. 1) to "push" the start icon 602, FIG. 3 is called to perform the pre-run process on the graphical network of FIG. 6. Block 302 determines that all data input pins are connected and block 304 determines that no input pins have multiple connections. Block 306 finds the start icon 602, so block 308 puts the start icon 602 onto the pending queue and block 312 puts icon F 626 on the pending queue, after the start icon. The other icons each have at least one input constraint and thus are not placed on the queue. Block 314 then calls FIG. 4 to process the graphical network of FIG. 6.

Block 402 points to the pending queue and done stack for the thread of FIG. 6, which is the only thread contained in the graphical network. Block 404 then determines that the pending queue is not empty, so block 406 gets the start icon 602 from the pending queue, and block 408 calls FIG. 5 to process the start icon. Block 502 determines that the icon has not been processed, so the processed flag is not set. Block 504 finds that there is no execute pin on the start icon 602, so no execute pin has been pinged. The start icon 602 has no control pin so block 506 transfers to block 510. There is no sequence input to the start icon so block 510 goes to block 514. Block 514 determines that there are no data input pins, which is the same as having data available on all input pins. Therefore, block 514 transfers to block 520 which determines that the start icon is not an iteration icon, so block 521 performs the function of the start, which is a no-op, and block 522 and 524 perform no functions since there is no data output from the start icon. Block 526 pushes the start icon onto the done stack, and block 518 removes the start icon from the pending queue.

Control then returns to block 402 which points to the same thread. Block 404 determines that the pending queue is not empty, so control goes to block 406 which gets an icon from the pending queue. As discussed earlier, the next icon on the pending queue is icon F 626, therefore block 406 retrieves icon F 626 from the pending queue, and block 408 calls FIGS. 5A and 5B to process icon F 626. Control proceeds to block 502, block 504, block 506, block 510, and to block 514. Block 514 finds that icon F has no data inputs, which is treated the same as having data available on all data inputs, so block 514 transfers to block 520 and then to block 521 which performs the functions of icon F Block 522 then sends data to icon C 608, and puts icon C 608 on the pending queue. Block 526 pushes icon F on the done stack, and block 518 removes icon F from the pending queue.

Control returns to block 402 which repeats this process for icon C 608. When icon C 608 is retrieved from the pending queue, control goes from block 502 to 504, 506, and then to block 510. Block 510 determines that a sequence pin is connected, and block 512 determines that the sequence pin has not been pinged. The sequence input to icon C has not been pinged because icon A 604 has not yet been processed. Block 516 finds no data from an earlier execution, and block 518 removes icon C 608 from the pending queue, leaving the pending queue empty.

Control then returns to block 402 which points to the same thread, and block 404 determines that the pending queue is empty, so control goes to block 410 which determines that the done stack is not empty so block 412 pops icon F (the last icon executed) from the done stack block 414 determines that icon F does not have a sequence output, so control goes back to block 410. Block 410 which determines that the done stack is not empty, so block 412 pops the start icon 602 from the done stack. Block 414 determines that the start block does have a sequence output, indicated by the arrowhead connection 603, and block 415 determines that there are no icons downstream of the start icon which are still executing (since the start block has no non-sequence outputs), so block 416 sends a sequence signal to the sequence input of icon A 604 and block 417 puts icon A 604 onto the pending queue. Control then returns to block 402 to process icon A 604.

At this point, the pending queue has icon A 604 as its only entry, and the done stack is empty.

Block 402 points to the same thread, and block 404 determines that the pending queue is not empty, so block 406 gets icon A 604 from the pending queue and block 408 calls FIG. 5A to process this icon. Block 502 determines that the icon has not been processed, so the processed flag is not set. Block 504 finds that there is no execute pin on icon A 604, so no execute pin has been pinged. The A icon has no control pin so block 506 transfers to block 510. There is a sequence input on the A icon so block 510 goes to block 512. Block 512 finds that the sequence pin has been pinged (when the start icon was removed from the done stack) so control goes to block 514. Block 514 determines that there are no data input pins, which is the same as having data available on all input pins. Therefore, block 514 transfers to block 520 which determines that icon A is not an iteration icon. Control transfers to block 521 which performs whatever function the A icon represents, and block 522 sends data output to the B icon 606, D icon 610, and to the C icon 608. Block 524 then puts the B icon 606, C icon 608 and D icon 610 onto the pending queue. Note that under Thread Rule 2 (Table 2) the order of placing the B, C, and D icons on the pending queue is undefined, since these icons are connected in parallel. Therefore, the above described order is coincidental. Block 526 then pushes the A icon onto the done stack, and block 518 removes the A icon 604 from the pending queue. Control then returns to block 402.

At this point, the pending queue contains icons B 606, C 608, and D 610, and the done stack contains icon A 604.

Block 402 then points to the same thread, and block 404 determines that the pending queue is not empty, so block 406 retrieves the next element from the pending queue, which is the B icon 606. Block 408 then calls FIG. 5A which processes the B icon by sending data to the E icon 612, placing the E icon 612 on the pending queue, placing the B icon 606 on the done stack, and deleting the B icon 606 from the pending queue. Control then returns to block 402.

At this point, the pending queue has icon C 608, icon D 610, and icon E 612. The done stack has icon A 604 and icon B 606.

The pending queue is not empty, so block 406 pulls the C icon 608 from the pending queue and block 408 calls FIG. 5A to process the C icon 608. The C icon has data since both the A icon and F icon have been fired earlier during execution of this thread. FIG. 5 processes the C icon 608 by sending data to the D icon 610. Block 524 of FIG. 5B does not, however, place icon D on the pending queue, because icon D is already present on the pending queue. The C icon 608 is placed on the done stack and deleted from the pending queue and control returns to block 402.

At this point, the pending queue has the D icon 610 and the E icon 612. The done stack has the A icon 604, B icon 606, and the C icon 608.

Again, block 402 points to this thread, block 404 determines that the queue is not empty, block 406 pulls the D icon 610 from the pending queue, and block 408 calls FIG. 5A to process the D icon 610. Block 510 determines that the D icon does have a sequence input connected, so it transfers to block 512. Block 512 determines that the sequence input of the D icon 610 has not yet received a signal, so control transfers to block 518 which removes the D icon from the pending queue. Control then returns to block 402.

Block 402 points to the current thread and block 404 determines that the pending queue is not empty, so block 406 pulls the E icon from the pending queue and block 408 calls FIG. 5A to process the E icon 612. The B icon 606 has already fired, but the D icon 610 has not yet fired, so the E icon 612 does not yet have all of its data. Therefore, control goes to block 518 which removes icon E from the pending queue and control returns to block 402.

At this point, the pending queue is empty and the done stack has the icons A 604, B 606, and C 608.

Block 402 points to the current thread and block 404 determines that the pending queue is empty, so control transfers to block 410 which finds that the done stack is not empty, so block 412 pops the C icon 608 from the done stack, and block 414 determines that the C icon 608 does not have a sequence output, so control goes back to block 410 and on to block 412 Block 412 then pops the B icon 606 from the done stack, block 414 determines that the B icon 606 does have a sequence output, arrowhead connection 620, and block 415 determines that no downstream icons are executing, so block 416 sends a sequence signal over arrowhead connection 620 to the D icon 610 and block 417 places the D icon onto the pending queue before control returns to block 402.

At this point, the pending queue contains the D icon 610, and the done stack contains the A icon 604.

Block 402 points to the same thread and block 404 finds that the pending queue is not empty, so block 406 pulls the D icon 610 from the pending queue, and block 408 calls FIG. 5A to process the D icon 610. Block 510 finds that the D icon 610 does have a sequence input connected, and transfers to block 512 which finds that the sequence input has received a signal, because of the process of popping B from the done stack, as described above. Therefore, control transfers to blocks 514, 520 and 521 which performs the functions of the D icon and block 522 sends data output to the E icon. Block 524 then places the E icon onto the pending queue, block 526 places the D icon on the done stack, and block 518 deletes the D icon from the pending queue before returning control to block 402.

Block 402 points to the same thread, and block 404 finds the pending queue is not empty, so block 406 gets the E icon from the pending queue and block 408 calls FIG. 5A to process the E icon. FIG. 5A finds that the E icon has data available on all of its input pins, so its functions are performed, and it is placed on the done stack, and deleted from the pending queue before returning to block 402.

Block 402 points to this thread and block 404 determines that the pending queue is empty, so control transfers to block 410 which finds that the done stack is not empty. Block 412 then pops the E icon 612 from the done stack, and block 414 determines that the E icon 612 does not have a sequence output so control transfers to block 410. Block 410 finds that the done stack is still not empty, so block 412 pops the D icon 610 from the done stack, and block 414 finds that D icon 610 has no sequence output, so block 414 transfers back to block 410. Again, block 410 finds that the done stack is not empty, so block 412 now pops the A icon 604 from the done stack and block 414 finds that the A icon 601 has no sequence output, so block 414 transfers back to block 410. Block 410 now finds that the done stack is empty, so control transfers to block 418 which determines that the only thread of FIG. 6 is now complete, and returns to FIG. 3 which also returns to its caller.

Figure 7:
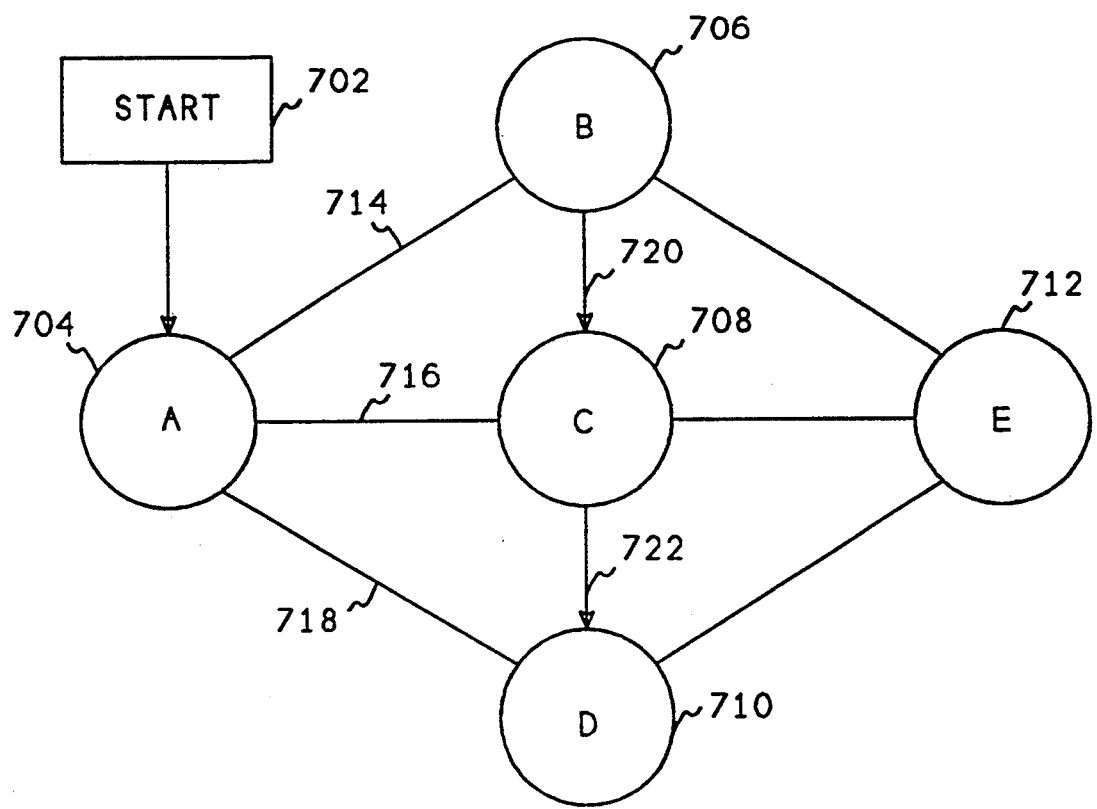
FIG. 7 shows an example of an iconic network forcing a particular order of processing.

FIG. 7 shows another example of an iconic network. The example of FIG. 7 shows a specific sequence for processing some of the icons. Referring now to FIG. 7, after the user "pushes" the start icon 702, it will fire, sending a sequence signal to the A icon 704. The A icon 704 will fire, sending data to the B icon 706, C icon 708, and D icon 710. This processing will be done in the manner described earlier with reference to FIGS. 3, 4, 5A and 5B. The arrowhead sequence connection 720 between B icon 706 and C icon 708 requires that the B icon 706 processes before the C icon 708. If the sequence connection 720 was absent, this order of processing would be indeterminate. Likewise, the sequence connection 722 between C icon 708 and D icon 710 forces the C icon 708 to be processed before the D icon 710. After the B icon 706, C icon 708, and D icon 710 have all processed, the E icon 712 can then process.

Figure 8:
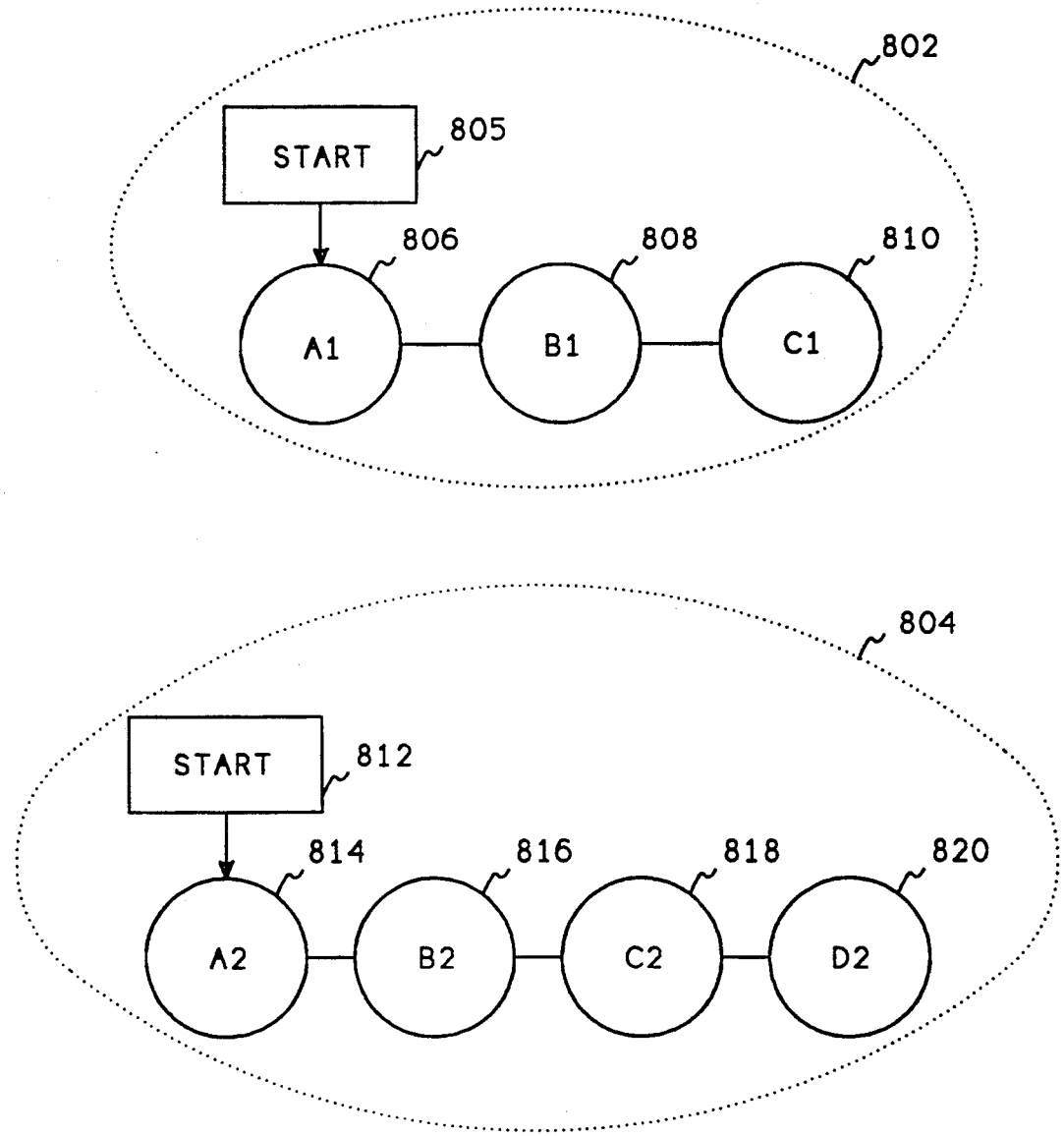
FIG. 8 shows an example of an iconic network having two threads.

The diagram of FIG. 8 shows an iconic network having two threads, each of which is a separate context. Referring now to FIG. 8, a thread 802 is comprised of a start icon 805, icon A1 806, icon B1 808, and icon C1 810. Another thread 804 is comprised of a start icon 812, icon A2 814, icon B2 816, icon C2 818, and icon D2 820. The invention will treat these two threads as a circular list, such that after processing thread 804, processing will continue with thread 802. The order of the threads is undetermined, and either thread may start processing first. For the following, it will be assumed that the thread 802 is the first to start processing. While processing the iconic network of FIG. 8, block 402 (FIG. 4) will satisfy Thread Rule 8 (Table 2) by processing an icon from thread 802 and then pointing to thread 804. After an icon from thread 804 has been processed, block 402 will point back to the pending queue and done stack of thread 802 to process one icon from that thread. This alternating will continue until icon C1 810 has been processed. At this point, thread 802 will be completely processed, and block 402 will continue to point to thread 804 until it has completed its processing, at which point processing will terminate.

As shown in the example described above, with reference to FIG. 6, 7 and 8, an icon will "fire" only once when all of its input data and/or its sequence input has been satisfied. This rule must be altered, however, for iteration icons such a icon 306 of FIG. 2. When an iteration icon is encountered, all of the icons connected to its data outputs are copied into a "virtual thread", as illustrated by blocks 532, 534, and 536 of FIG. 5B. For each iteration, the thread containing the iteration icon will be blocked from processing to allow the virtual thread to be processed in the manner described with respect to FIGS. 3, 4, 5A and 5B. After the processing is completed for the virtual thread, it will be deactivated and the iteration icon and its thread will be unblocked for the next iteration. With the next iteration, the virtual thread will be reactivated, processed, and deactivated. This will continue until all iterations of the iteration icon have been completed, at which time the sequence output of the iteration icon will be fired and the icons connected to the sequence output will be processed in the normal manner.

When a subprogram icon is encountered, all of the icons inside the subprogram object are included in zero or more subthreads, and a new context, which also obeys the context rules of Table 3. The calling icon, but not its thread, will be blocked from processing to allow the subthread to be processed in the manner described with respect to FIGS. 3, 4, 5A and 5B. After the processing is completed for the subthread, the calling icon will be unblocked.

Figure 9:
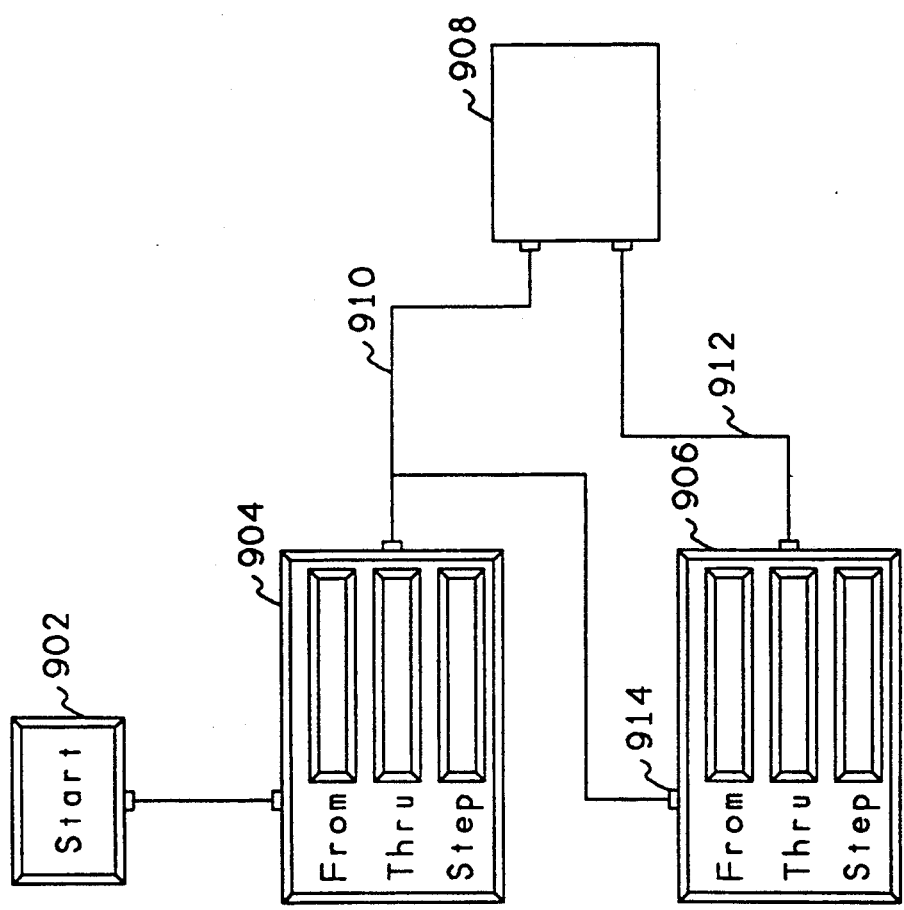
FIG. 9 shows an example of an iconic network having two iteration icons.

FIG. 9 shows an iconic network having two iteration icons, and illustrates the decision block 516 of FIG. 5A. Referring now to FIG. 9, when the user activates the network, the start icon will fire a sequence signal to iteration icon 904. Iteration icon 904 will sent data over connection 910 to icon 908 and also to the sequence input 914 of iteration icon 906. Because of the connections between the iteration icons, icon 906 will process all its iterations each time iteration 904 fires once. Therefore, icon 908 is on two virtual threads, one from icon 904 and one from icon 906. If the decision of block 516 were not made, icon 908 would only fire once for each iteration of icon 904 and the first iteration of icon 906, because data would only be available when both icon 904 and icon 906 had just fired. Although icon 906 would fire several times for each iteration of icon 904, the data from connection 910 would have been used up with the first firing of icon 908 and it would not fire again until icon 904 had fired again. Block 516 detects this condition and allows the data on connection 910 to be reused by icon 908, thus allowing icon 908 to fire every time icon 906 supplies data. For example, if icon 904 iterates five times, and icon 906 iterates four times (each time it receives a signal on its sequence input 914), icon 908 will fire twenty times.

Because a thread containing an iteration icon will block during execution of the virtual thread extending from the iteration icon, the system will postpone firing of iteration icons on a thread until all other non-iteration icons have fired. Thus blocks 528 and 530 (FIG. 5B) will postpone firing of an iteration icon by placing that icon below all non-iteration icons in the pending queue. Once all the non-iteration icons on the pending queue have fired, block 528 will transfer to block 532 and build a virtual thread for the iteration icons.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

ICON DEVICE RULES

1. All data input pins must be connected; only one trace connection is allowed on any input pin.
2. All output pin connections are optional; more than one trace can be connected to each output pin.
3. The sequence input need not be connected, but if connected, it is treated as a data input.
4. A device executes only when each data input pin and each connected sequence input pin has been pinged, with the following exceptions:
   a. A data or sequence input which is connected to an output of a device having valid data from an earlier execution of the same thread, will be considered as having received data; and
   b. If a device receives a ping on an execute pin, the device will execute regardless of whether the device has received data on all data pins or all connected sequence pins.
5. Receiving a ping on a control input will cause some assigned action to be performed, but does not otherwise affect execution -- that is, execution is never stopped because data is not available on a control input.
6. Sequence Out fires (pings) only after all other data output pins have fired, and even then only after propagation, along all standard output lines, has continued as far as possible. Like other outputs, the sequence output may be connected to more than one trace.
7. An error output will fire (ping) in lieu of all other data outputs when an untrapped exception arises while processing the device. Like other outputs, the error output may be connected to more than one trace.
8. Each device executes only once per activation of a thread within a context unless the device is attached to a virtual context device, such as an iteration device.

TABLE 2

THREAD RULES

1. A device which is connected to another device is considered to be on the same thread as that device, thus an unconnected device is its own thread.
2. Devices which are connected in parallel directly to the output of any other device will not be guaranteed to execute in any particular order or even the same order from one load of the program to the next.
3. Devices which have no data input pins or connected sequence input pins will be executed prior to all other devices on a thread except start devices.
4. All start devices will be executed before any other unconstrained devices.
5. Start icon devices are not required for a thread unless a feedback loop is present on the thread. If a feedback loop is present, a start icon device is required in order to guarantee normal order of execution (a user will be told of the need for a start icon, at run time, if a feedback loop is detected and no start icon is present).
6. Multiple start devices on the same thread result in multiple entry points for the thread; all start icons will fire before any other icon devices on the thread. The order of execution of the several start icons will not be guaranteed, nor will the order of execution from one load of the program to the next.
7. Execution of a thread having no start icon device will proceed "correctly" as far as the sequencing constraints implied by the device connections, but the order of execution of two or more independent and parallel subthreads will not be predictable.
8. Parallel threads are executed in round-robin style with each thread getting the processor for one primitive icon per cycle, excluding iteration icons and any form of multiple icon construct such as an iconic subprogram.

TABLE 3

CONTEXT RULES

1. A context is a main program (root context) or any subprogram.
2. Devices connected to the same context input or output buffers are considered to be on the same thread.
3. Context inputs operate as unconstrained devices and will thus fire before any other devices on a thread except for start devices.
4. When execution of a context terminates, only those data outputs which were pinged from the inside of the context will fire -- all others will retain their previous data, but will not fire.
5. Execution of a context terminates whenever all threads in the context have completed execution as far as possible.
6. Execution of an 'exit thread' device (or a break device outside the scope of an iterative subthread) on any thread in a context will cause that thread to terminate. Any other threads within the context will continue.
7. Execution of an 'exit subprogram' device on any thread in a context will cause all threads within the context to terminate, thus terminating execution of the entire context.
8. Execution of an 'exit program' device will abort all other operations, post the user-specified exit code, and terminate the program.

What is claimed is:

1. In an iconic programming system having multiple icons executing in a computer system, wherein each icon in said programming system may have zero or more data input connections and zero or more data output connections, and wherein said icons are graphically connected together by a user of the computer system graphically connecting data output connections to data input connections to form a network of icons, a computer implemented method for processing said icons of said network to perform data processing functions represented by said icons, said computer implemented method for processing comprising the steps of:

(a) programmatically examining all icons within said network and discontinuing processing if all data input connections of all said icons are not connected to a data output connection of another icon;

(b) programmatically examining all icons within said network and discontinuing processing if any data input connection of any of said icons is connected to a data output connection of more than one other icon;

(c) programmatically examining all icons within said network and programmatically scheduling all start icons in said network to be processed before any other icons are processed;

(d) when said network contains no start icons, randomly scheduling all icons having no data input connections to be processed before any other icons are processed;

(e) when processing an icon, programmatically scheduling, for processing, all icons connected to data output connections of said icon being processed;

(f) when an icon is being processed, and said icon contains data input connections that have not received data, either from a current or previous execution of the icon supplying data, discontinuing processing of said icon; and (g) processing each said icon of said network of icons after said icon is scheduled and said icon has received data on all said input connections of said icon.

2. The computer implemented method for processing of claim 1 wherein said step (c) further comprises the step of examining said network and discontinuing processing if said network contains one or more feedback loops, wherein a data output of a first icon connects directly or through at least one other icon to a data input of said first icon, and said network does not contain at least one start icon.

3. In an iconic programming system having multiple icons executing in a computer system, wherein each icon in said programming system may have zero or more data input connections, zero or more data output connections, an optional sequence input connection and an optional sequence output connection, and wherein said icons are graphically connected together by a user of the computer system graphically connecting data output connections and sequence output connections of icons to data input connections and to sequence input connections of other icons to form a network of icons, a computer implemented method for processing said icons of said network to perform data processing functions represented by said icons, said computer implemented method for processing comprising the steps of:

(a) programmatically placing all start icons in said network into a pending queue to cause said start icons to be processed before processing any other icons;

(b) when said network contains no start icons, randomly placing all icons having no data input connections into said pending queue to cause said icons having no data input connections to be processed before processing any other icons; and (c) processing a next icon from said pending queue comprising the steps of (c1) if said next icon has a sequence input connection and said sequence input has received a signal from a sequence output connection of another icon, and each data input connection of said next icon has had data transferred to said data input connection from a data output connection of another icon, processing said next icon comprising the steps of (a) programmatically executing any data processing functions defined for said next icon, (b) transferring output data, created by programmatically executing said data processing functions defined for said next icon, to all icons connected to data output connections of said next icon, and (c) programmatically placing all icons connected to said data output connections of said next icon into said pending queue for subsequent processing, and (c2) if said next icon has no sequence input connection and each data input connection of said next icon has had data transferred to said data input connection from a data output connection of another icon, processing said icon comprising the steps of (c2a) programmatically executing any data processing functions defined for said next icon, (c2b) transferring output data, created by programmatically executing said data processing functions defined for said next icon, to all icons connected to data output connections of said next icon, and (c2c) programmatically placing all icons connected to said data output connections of said next icon into said pending queue for subsequent processing.

4. The process of claim 3 wherein each icon in said programming system may further have zero or more control input connections, and wherein step (c) of said computer implemented method for processing further comprises the step of:

(c3) when said next icon has input on a control input, programmatically executing any data processing functions defined only for said control input.

5. The process of claim 3 wherein each icon in said programming system may further have zero or more execute input connections, and wherein step (c) of said computer implemented method for processing further comprises the step of:

(c3) if said next icon has received data on an execute input, processing said next icon comprising the steps of (c3a) programmatically executing any data processing functions defined for said next icon, (c3b) transferring output data, created programmatically executing said data processing functions defined for said next icon, to all icons connected to data output connections of said next icon, and (c3c) programmatically placing all icons connected to said data output connections of aid next icon into said pending queue for subsequent processing.

6. The process of claim 3 further comprising the following steps wherein the following step (c3) is performed after step (c2) and wherein the following steps (d) through (i) are performed after step (c3):

(C3) after an icon is processed, programmatically placing said icon at a top location on a done stack;

(d) repeating step (c) until said pending queue is empty;

(e) removing a top icon from a top location of said one stack;

(f) programmatically sending a sequence signal to all icons connected to a sequence output of said top icon;

(g) programmatically placing all icons connected to said sequence output of said top icon into said pending queue;

(h) if said pending queue is not empty, continuing with step (c); and (i) if said done stack is not empty, continuing with step (e).

7. The process of claim 3 wherein step (a) further comprises the step of:
- (a1) programmatically examining said network of icons and discontinuing processing if said network of icons contains one or more feedback loops, wherein a data output connection of a first icon is connected directly or through at least one other icon to a data input connection of said first icon, and said network of icons does not contain at least one start icon.

8. In an iconic programmatic system having multiple icons executing in a computer system, wherein each icon in said programming system may have zero or more data input connections, zero or more data output connections, an optional sequence input connection and an optional sequence output connection, and wherein said icons are graphically connecting together by a user of the computer system graphically connecting data output connections and sequence output connections of icons to data input connections and to sequence input connections of other icons to form at least one network of icons, a computer implemented method for processing said icons of said network to perform data processing functions represented by said icons, said computer implemented method for processing comprising the steps of:
- (a) programmatically separating said icons into a list of connected icon threads comprising the steps of
  - (a1) selecting a first icon for a thread,
  - (a2) selecting all icons connected to data output connections or sequence output connections of said first icon for said thread,
  - (a3) repeating step (a2) for all icons selected in step (a2), and
  - (a4) repeating steps (a1) through (a3) if unselected icons remain in said network of icons;
- (b) programmatically creating a pending queue and a done stack for each of said threads;
- (c) programmatically placing all start icons selected for each of said threads into said pending queue for said thread;
- (d) when a thread contains no start icons, randomly placing all icons in said thread that have no data input connections into said pending queue for said thread;
- (e) selecting one of said threads for processing;
- (f) if said pending queue of said selected thread is not empty, selecting a next icon from said pending queue and processing said next icon comprising the steps of
  - (f1) if said next icon has a sequence input connection and said sequence input connection has received a signal from a sequence output connection of another icon, and each data input connection of said next icon has had data transferred to said data input connection from a data output connection of another icon, processing said next icon comprising the steps of
    - (f1a) programmatically executing any data processing functions defined for said next icon,
    - (f1b) transferring output data, created by programmatically executing said data processing functions defined for said next icon, to all icons connected to data output connections of said next icon, and
    - (f1c) programmatically placing all icons connected to said data output connections of said next icon into said pending queue for subsequent processing,
  - (f2) if said next icon has no sequence input connection and each data input connection of said next icon has had data transferred to said data input connection from a data output connection of another icon, processing said next icon comprising the steps of
    - (f2a) programmatically executing any data processing functions defined for said next icon,
    - (f2b) transferring output data, created by programmatically executing said data processing functions defined for said next icon, to all icons connected to data output connections of said next icon, and
    - (f2c) programmatically placing all icons connected to said data output connections of said next icon into said pending queue for subsequent processing, and
  - (f3) if said next icon was processed by step (f1) or step (f2), placing said next icon at a top location on said done stack of said selected thread;
- (g) if said pending queue for said selected thread is empty and said done stack of said selected thread is not empty, processing said thread comprising the steps of
  - (g1) removing a top icon from a top location of said done stack,
  - (g2) programmatically sending a sequence signal to all icons connected to a sequence output connection of said top icon, and
  - (g3) programmatically placing all icons connected to said sequence output connection of said top icon on said pending queue of said selected thread; and
- (h) repeating steps (e) through (g) until all pending queues and all done stacks created in step (b) are empty.

9. The process of claim 8 wherein step (d) further comprises the step of:
- (d1) programmatically examining each of said threads and discontinuing processing if any thread contains one or more feedback loops, wherein a data output connection of a first icon connects directly or through at least one other icon to a data input connection of said first icon, and said thread does not contain at least one start icon.

10. In an iconic programmatic system having multiple icons executing in a computer system, wherein each icon in said programming system may have zero or more data input connections, zero or more data output connections, an optional sequence input connection and an optional sequence output connection, and wherein said icons are graphically connected together by a user of the computer system graphically connecting data output connections and sequence output connections of icons to data input connections and to sequence input connections of other icons to form at least one network of icons, a computer implemented method for processing said icons of said network to perform data processing functions represented by said icons, said computer implemented method for processing comprising the steps of:

(a) programmatically separating said icons into a list of connected icon threads comprising the steps of
  (a1) selecting a first icon for a thread,
  (a2) selecting all icons connected to data output connections or sequence output connections of said first icon for said thread,
  (a3) repeating step (a2) for all icons selected in step (a2), and
  (a4) repeating steps (a1) through (a3) if unselected icons remain in said network of icons;

(b) programmatically creating a pending queue and a done stack for each of said threads;

(c) programmatically placing all start icons selected for each of said threads into said pending queue for said thread;

(d) when a thread contains no start icons, randomly placing all icons in said thread that have no data input connections into said pending queue for said thread;

(e) selecting one of said threads for processing;

(f) if said pending queue of said selected thread is not empty, selecting a next icon from said pending queue and processing said next icon comprising the steps of
  (f1) if said next icon is an iteration icon, placing all icons connected, directly or through at least one other icon, to data output connections of said next icon into a virtual thread, blocking any further processing of said selected thread, placing said virtual thread onto said list of threads, selecting said virtual thread for processing, then continuing with step (f),
  (f2) if said next icon is a subprogram icon, placing all icons below said subprogram icon into a subthread, blocking any further processing of said selected thread, placing said subthread onto said list of threads, selecting said subthread for processing, then continuing with step (f),
  (f3) if said next icon has a sequence input connection and said sequence input connection has received a signal from a sequence output connection of another icon, and each data input connection of said next icon has had data transferred to said data input connected from a data output connection of another icon, processing said next icon comprising the steps of
    (f3a) programmatically executing any data processing functions defined for said next icon,
    (f3b) transferring output data, created by programmatically executing said data processing functions defined for said next icon, to all icons connected to data output connections of aid next icon, and
    (f3c) programmatically placing all icons connected to said data output connections of said next icon into said pending queue for subsequent processing, and
  (f4) if said next icon has no sequence input and each data input connection of said next icon has had data transferred to said data input connection from a data output connection of another icon, processing said next icon comprising the steps of
    (f4a) programmatically executing any data processing functions defined for said next icon,
    (f4b) transferring output data, created by programmatically executing said data processing functions defined for said next icon, to all icons connected to data output connections of said next icon, and
    (f4c) programmatically placing all icons connected to said data output connections of said next icon into said pending queue for subsequent processing, and
  (f5) if said next icon was processed by step (f3) or step (f4), placing said icon at a top location on said done stack of said selected thread;

(g) if said pending queue of said selected thread is empty and said done stack of said selected thread is not empty, processing said thread comprising the steps of
  (g1) removing a top icon from a top location of said done stack of said selected thread,
  (g2) programmatically sending a sequence signal to all icons connected to a sequence output connection of said top icon, and
  (g3) programmatically placing all icons connected to said sequence output connection of said next icon on said pending queue of aid selected thread;

(h) if said pending queue of said selected thread is empty and said done stack of said selected thread is empty, processing said thread comprising the steps of
  (h1) if said selected thread is a virtual thread, removing said selected thread from said list of threads and unblocking said thread containing said iteration icon from which said virtual thread was created, whereby said thread containing said iteration icon is allowed to continue processing, and
  (h2) if said thread is a subthread, unblocking said thread containing said subprogram icon that called said subthread and placing said subprogram icon on said done stack, whereby said thread containing said subthread icon is allowed to continue processing; and (i) repeating steps (e) through (h) until all said pending queues and all said done stacks of all said threads are empty.

11. The process of claim 10 wherein step (d) further comprises the step of:
  (d1) programmatically examining each of said threads and discontinuing processing if any thread contains one or more feedback loops, wherein a data output of a first icon connects directly or through at least one other icon to a data input of said first icon, but does not contain at least one start icon.

* * * * *

UNITED STATES PATENT AND TRADEMARK OFFICE
CERTIFICATE OF CORRECTION

PATENT NO. : 5,313,574
DATED : 5/17/94
INVENTOR(S) : Douglas C. Beethe

It is certified that error appears in the above-indentified patent and that said Letters Patent is hereby corrected as shown below:

Claim 5, C 16, l 58: Delete "aid" and insert therefor --said--

Claim 8, C 17, l 23: Delete "programmatic" and insert therefor --programming--

Claim 8, C 17, l 29: Delete "connecting" and insert therefor --connected--

Claim 10, C 18, l 59: Delete "programmatic" and insert therefor --programming--

Claim 10, C 19, l 51: Delete "connected" and insert therefor --connection--

Claim 10, C 19, l 61: Delete "aid" and insert therefor --said--

Claim 10, C 20, l 33: Delete "aid" and insert therefor --said--

UNITED STATES PATENT AND TRADEMARK OFFICE
CERTIFICATE OF CORRECTION

PATENT NO. : 5,313,574
DATED : 5/17/94
INVENTOR(S) : Douglas C. Beethe

It is certified that error appears in the above-indentified patent and that said Letters Patent is hereby corrected as shown below:

On the title page:
In the title Delete "For starting" and insert therefor --To start-- as amended.

Signed and Sealed this

Twelfth Day of December, 1995

Attest:

BRUCE LEHMAN

Attesting Officer

Commissioner of Patents and Trademarks